United States Patent
Houldsworth

(10) Patent No.: US 8,831,904 B2
(45) Date of Patent: *Sep. 9, 2014

(54) CELL BASED TEMPERATURE MONITORING

(71) Applicant: Texas Instruments Incorporated, Dallas, TX (US)

(72) Inventor: John Houldsworth, Reston, VA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/656,453

(22) Filed: Oct. 19, 2012

(65) Prior Publication Data

US 2013/0332103 A1 Dec. 12, 2013

Related U.S. Application Data

(63) Continuation of application No. 12/526,017, filed on Aug. 5, 2009, now Pat. No. 8,306,771.

(51) Int. Cl.
  *G01K 1/00* (2006.01)
  *G01K 13/00* (2006.01)
  *G01K 7/42* (2006.01)

(52) U.S. Cl.
  CPC .................... *G01K 13/00* (2013.01); *G01K 7/427* (2013.01)
  USPC ........................................................ 702/130

(58) Field of Classification Search
  CPC ......... G01K 7/42; G01K 15/00; G01K 3/005; G01K 1/026; G06F 1/206
  USPC ........................................................ 702/130
  See application file for complete search history.

(56) References Cited

U.S. PATENT DOCUMENTS

| | | | | |
|---|---|---|---|---|
| 5,701,068 A | * | 12/1997 | Baer et al. | 320/119 |
| 5,710,504 A | * | 1/1998 | Pascual et al. | 180/65.8 |
| 5,767,659 A | | 6/1998 | Farley | |
| 6,043,628 A | * | 3/2000 | Perelle et al. | 320/119 |
| 6,264,111 B1 | | 7/2001 | Nicolson et al. | |
| 7,054,720 B2 | | 5/2006 | Cooper | |
| 7,660,694 B2 | | 2/2010 | Wu et al. | |
| 8,306,771 B2 | * | 11/2012 | Houldsworth | 702/130 |
| 2002/0138159 A1 | | 9/2002 | Atkinson | |
| 2006/0012334 A1 | | 1/2006 | Watson | |

OTHER PUBLICATIONS

PCT Search Report.

* cited by examiner

*Primary Examiner* — Tung S Lau
*Assistant Examiner* — Xiuquin Sun
(74) *Attorney, Agent, or Firm* — William B. Kempler; Frederick J. Telecky, Jr.

(57) ABSTRACT

A system and method for measuring a temperature in at least one energy storage unit. They system includes at least one temperature sensor thermally coupled to the at least one energy storage unit, and a battery management controller in communication with the at least one temperature sensor. The battery management controller is configured to process a temperature of the at least one energy storage unit to obtain an internal temperature in the at least one energy storage unit.

25 Claims, 14 Drawing Sheets

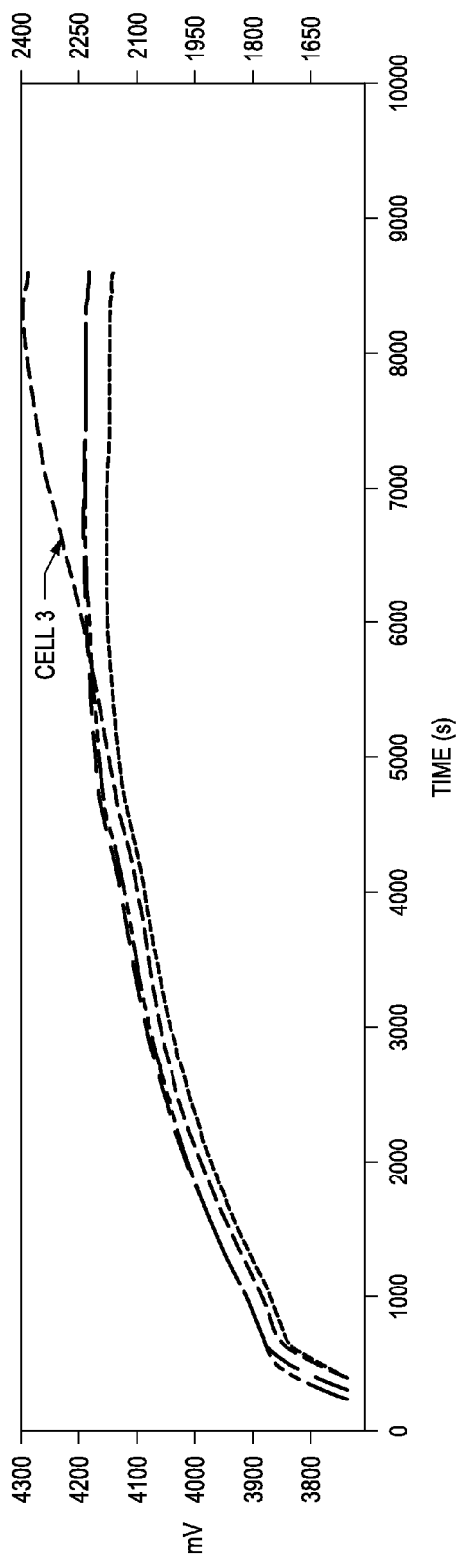
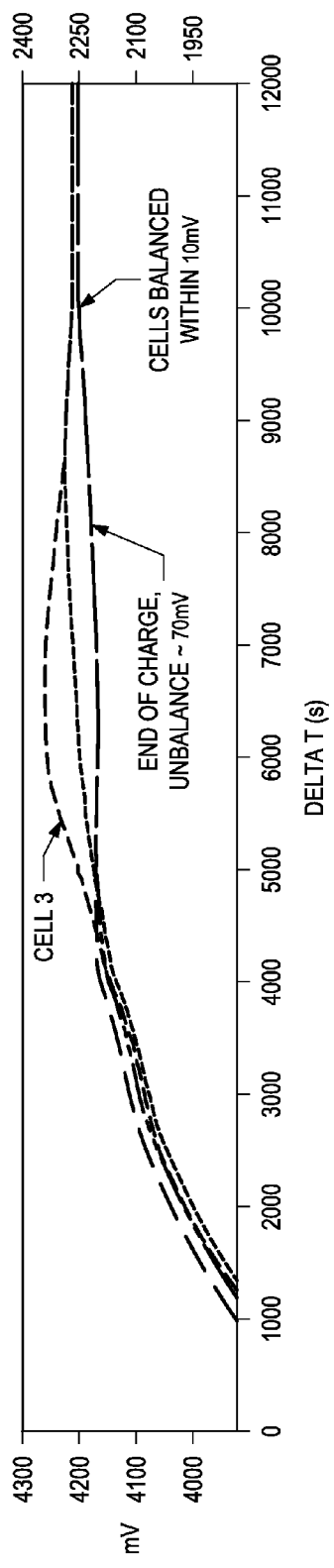

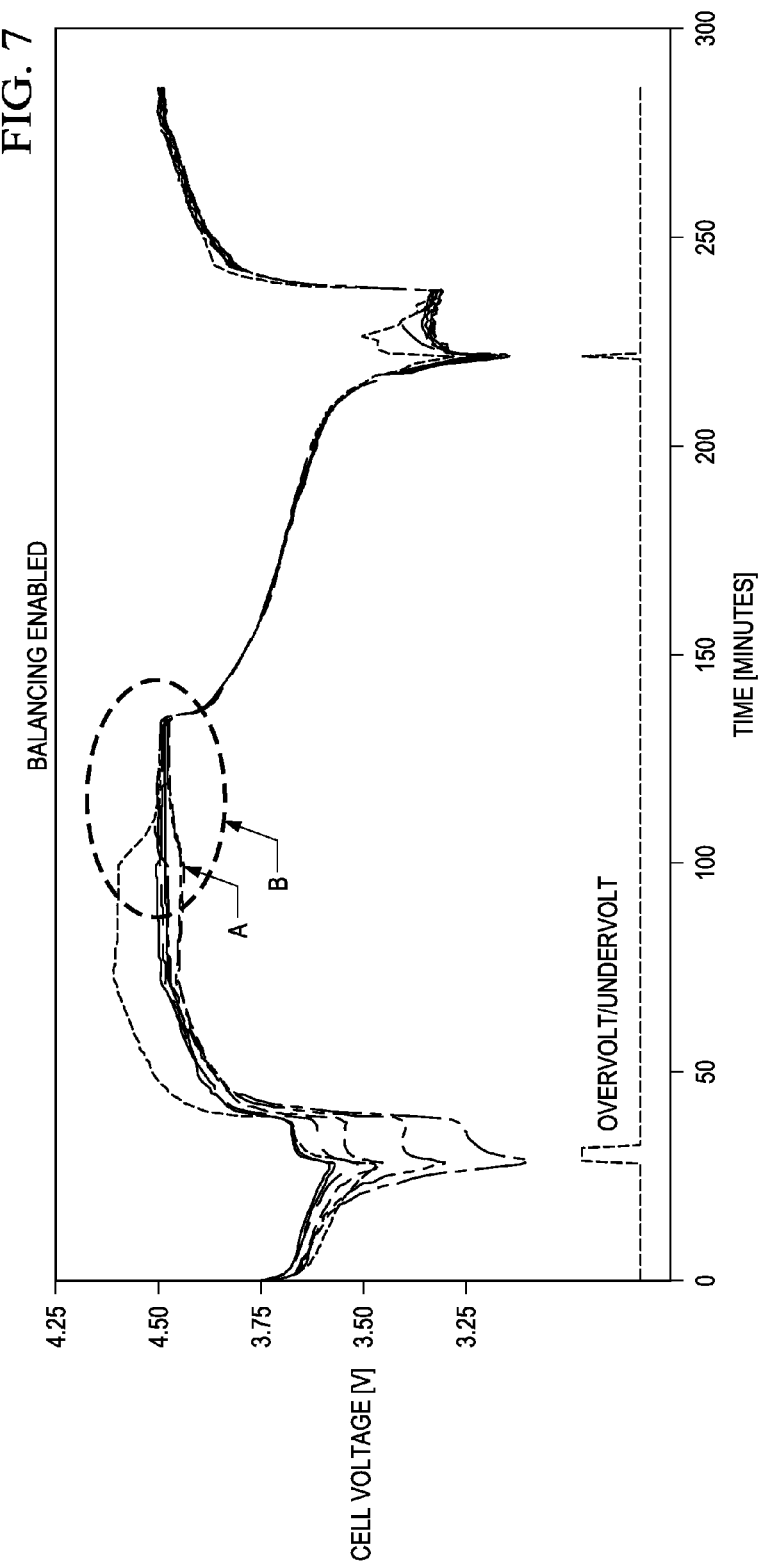

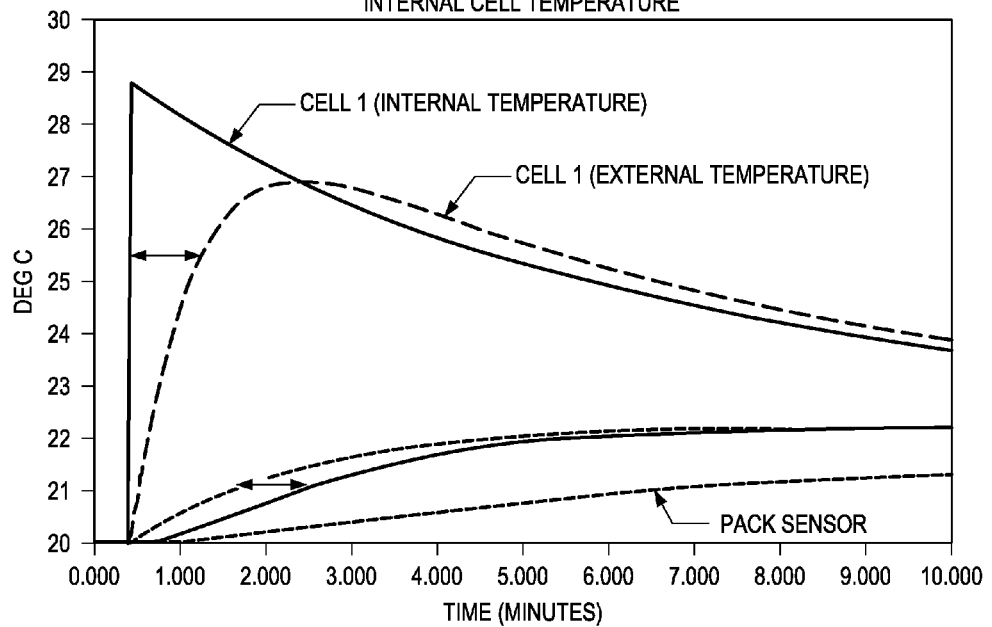

US 8,831,904 B2

CELL BASED TEMPERATURE MONITORING

CROSS-REFERENCE TO RELATED APPLICATIONS

This application is a continuation of U.S. application Ser. No. 12/526,017, filed Aug. 5, 2009 (Now U.S. Pat. No. 8,306,771, issued Nov. 6, 2012), which claims priority from PCT Application No. PCT/US2007/082246, filed Oct. 23, 2007, and U.S. Provisional Application No. 60/862,532, filed on Oct. 23, 2006, the entire contents of which are hereby incorporated by reference.

FIELD OF INVENTION

The present invention relates to a method and system for monitoring temperature in a plurality of energy storage units.

BRIEF DESCRIPTION OF DRAWINGS

Further aspects of the invention will appear from the appended claims and from the following detailed description given with reference to the appended drawings.

FIGS. 3 and 3A-3D are a detailed circuit diagram of system for managing energy in a plurality of energy storage units connected in series, according to an embodiment of the present invention;

FIG. 5A is a plot of the voltage across each cell when charge balancing is not enabled or not provided versus the time of charge;

FIG. 5B is a plot of the voltage across each cell when charge balancing is enabled versus the time of charge;

FIG. 7 is a plot of the voltage across each cell versus the time during charge-discharge cycles showing the effect of enabling charge balancing on the voltage across each cell;

FIG. 14 is a plot of simulated internal and external temperatures of 2 cells and a temperature of a pack versus time.

DETAILED DESCRIPTION OF EXAMPLE EMBODIMENTS

Figure 1:
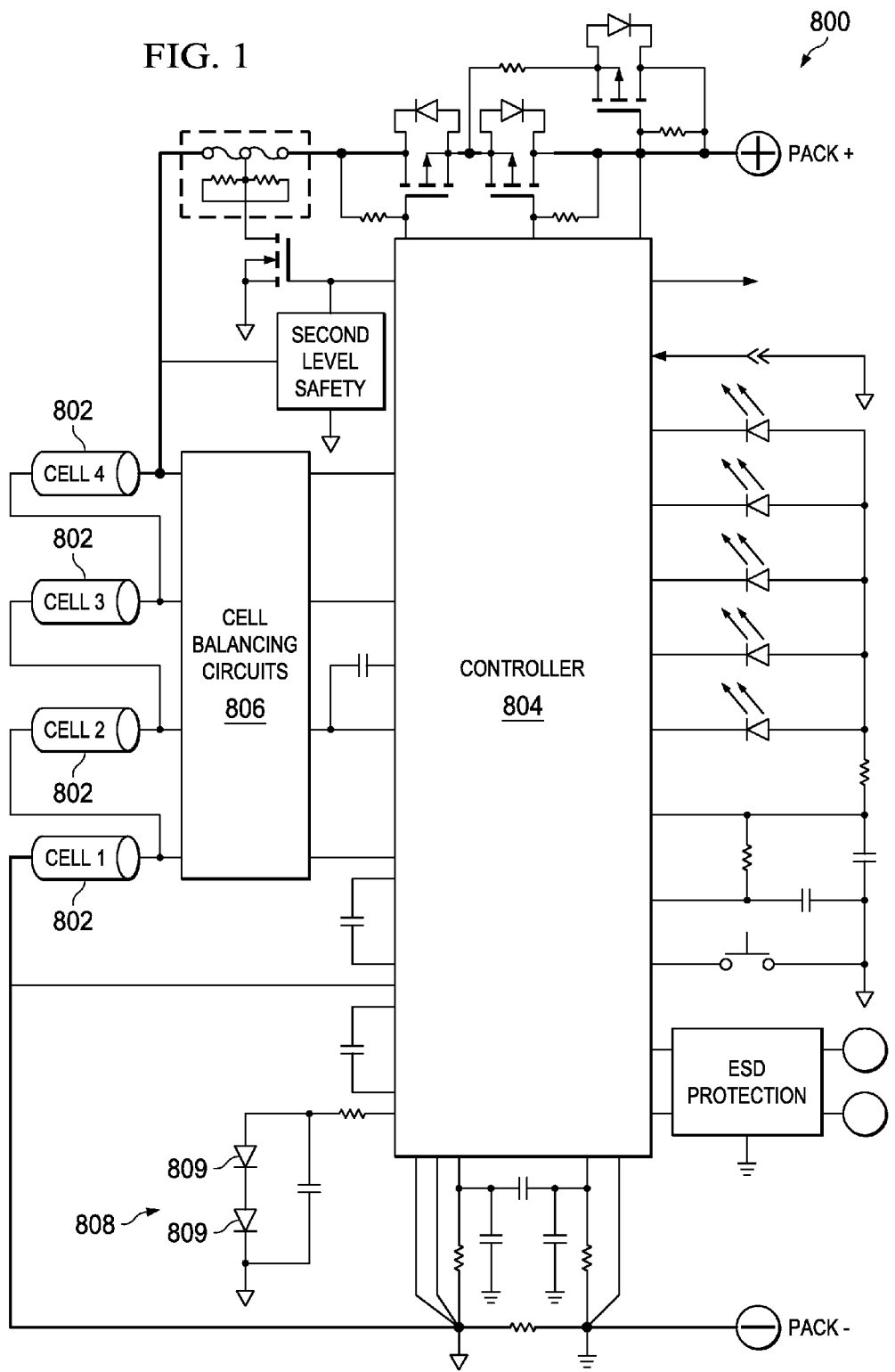
FIG. 1 is a circuit diagram of a system for managing energy in a plurality of energy storage units connected in series, according to another embodiment of the present invention.

FIG. 1 is a circuit diagram of a system 800 for managing energy and monitoring temperature in a plurality of energy storage units 802 connected in series, according to an embodiment of the present invention. The system 800 for managing energy includes a battery management controller 804 and cell balancing circuits 806. The battery management controller 804 is connected to and is configured to control the cell balancing circuits 806. The cell balancing circuits 806 are connected to the energy storage units 802. The battery management controller 804 provides measurement and monitoring of current and voltages on each of the energy storage units (cells) 802. In fact, the current flowing through the pack and individual cell voltages can be measured simultaneously to be able to accurately measure cell impedance. The battery management controller 804 may include cell measurement and control units (shown in FIG. 2), each cell measurement and control unit being associated with one of the plurality of energy storage units (cells) 802. The system 800 further comprises one or more temperature circuits 808 for connecting to one or more temperature sensors 809. The one or more temperature sensors 809 measure the temperature of each of the plurality of energy storage units or cells individually. In FIG. 1, only one temperature measurement circuit is shown for clarity purposes. However, it must be appreciated that one, two or more temperature measurement circuits (for example, 4 circuits) may be used. The balancing circuits 806 are configured to balance charge between the plurality of energy storage units 802. Balancing with system 800 can occur full time, e.g., during charging, during discharging and during idle. Balancing occurs cell-to-cell and globally across the pack of cells.

Figure 2:
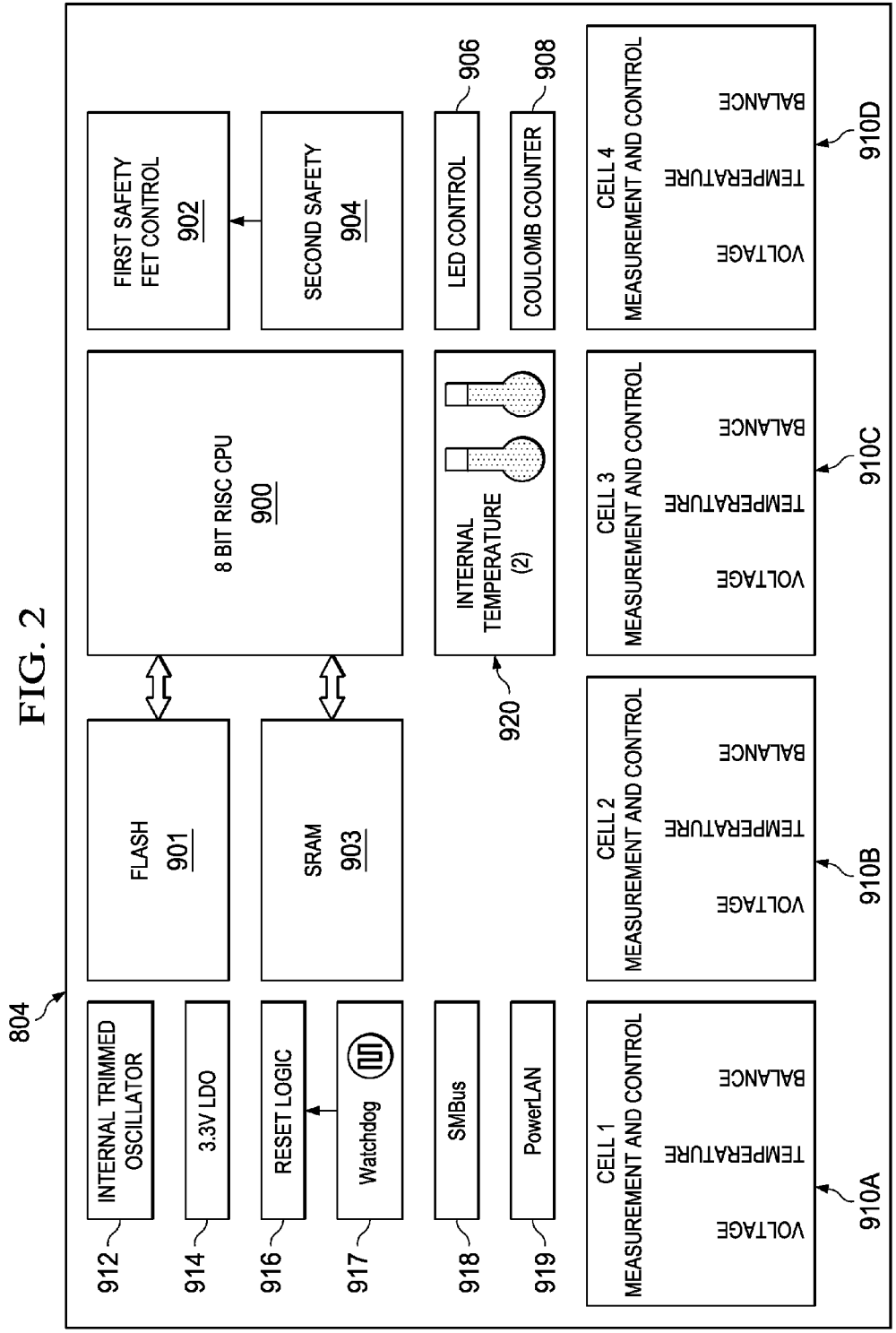
FIG. 2 is a block diagram of the battery management controller depicted in FIG. 1, according to an embodiment of the present invention.
Figure 3A:
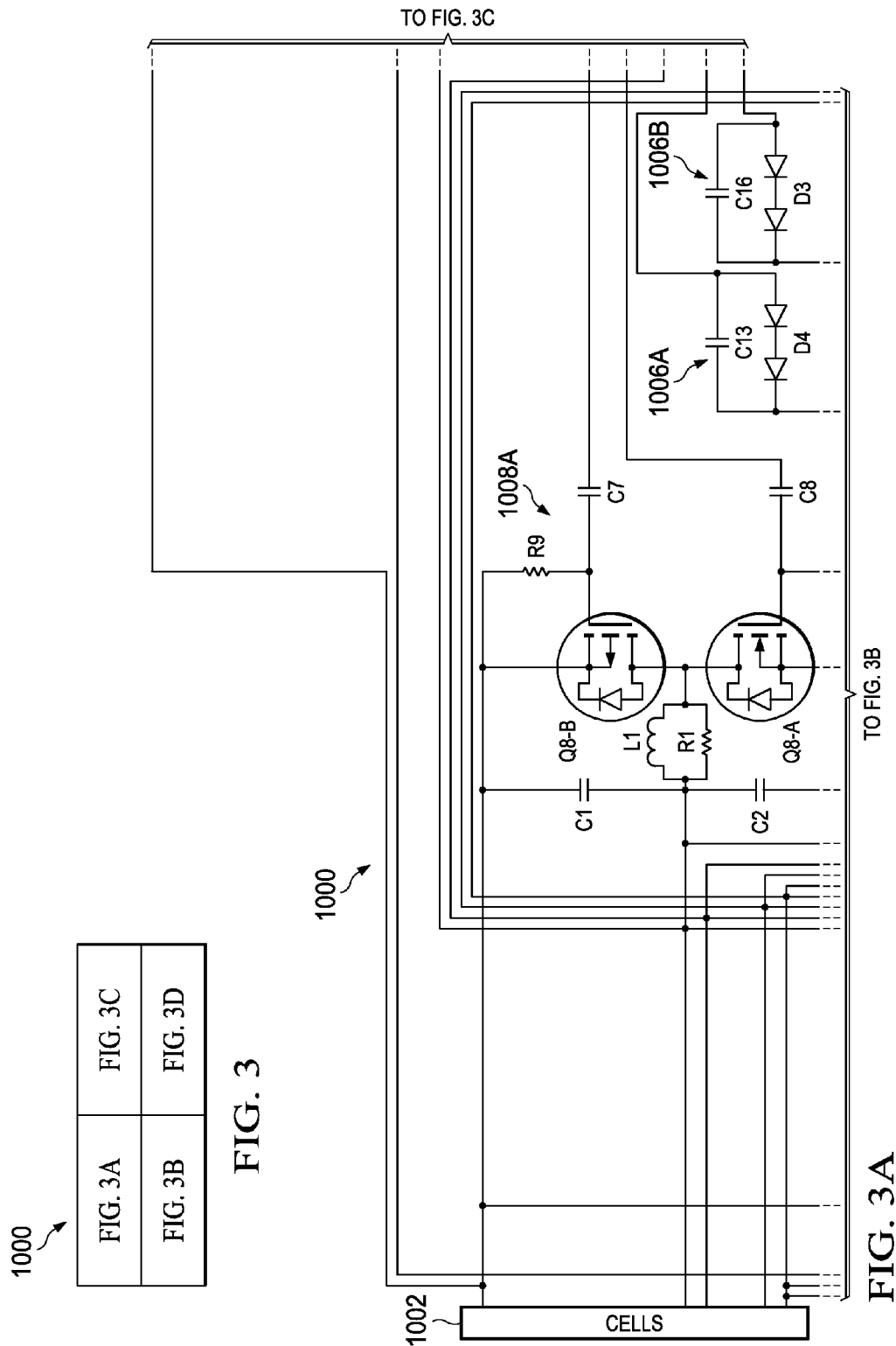
Figure 3B:
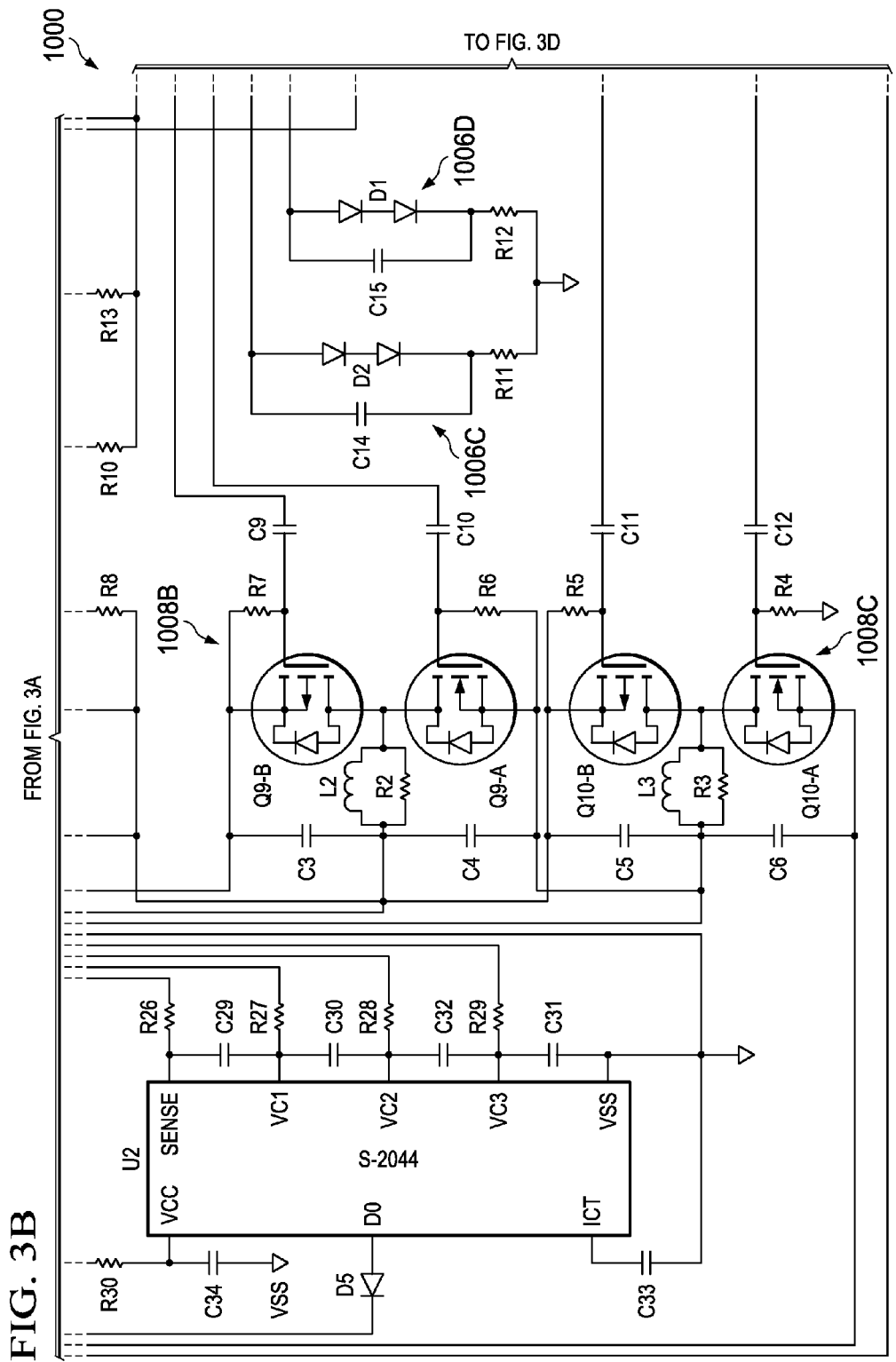
Figure 3C:
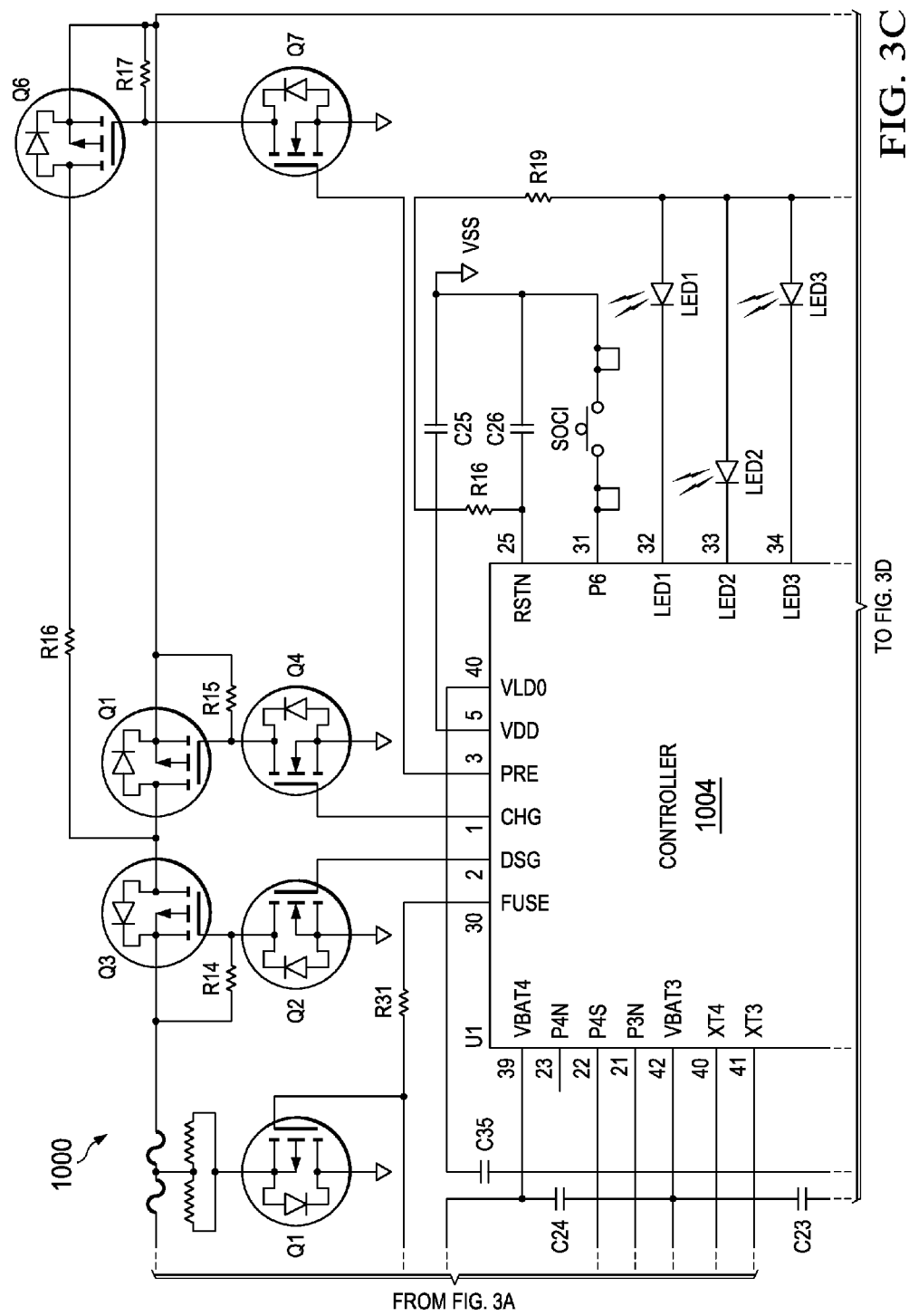
Figure 3D:
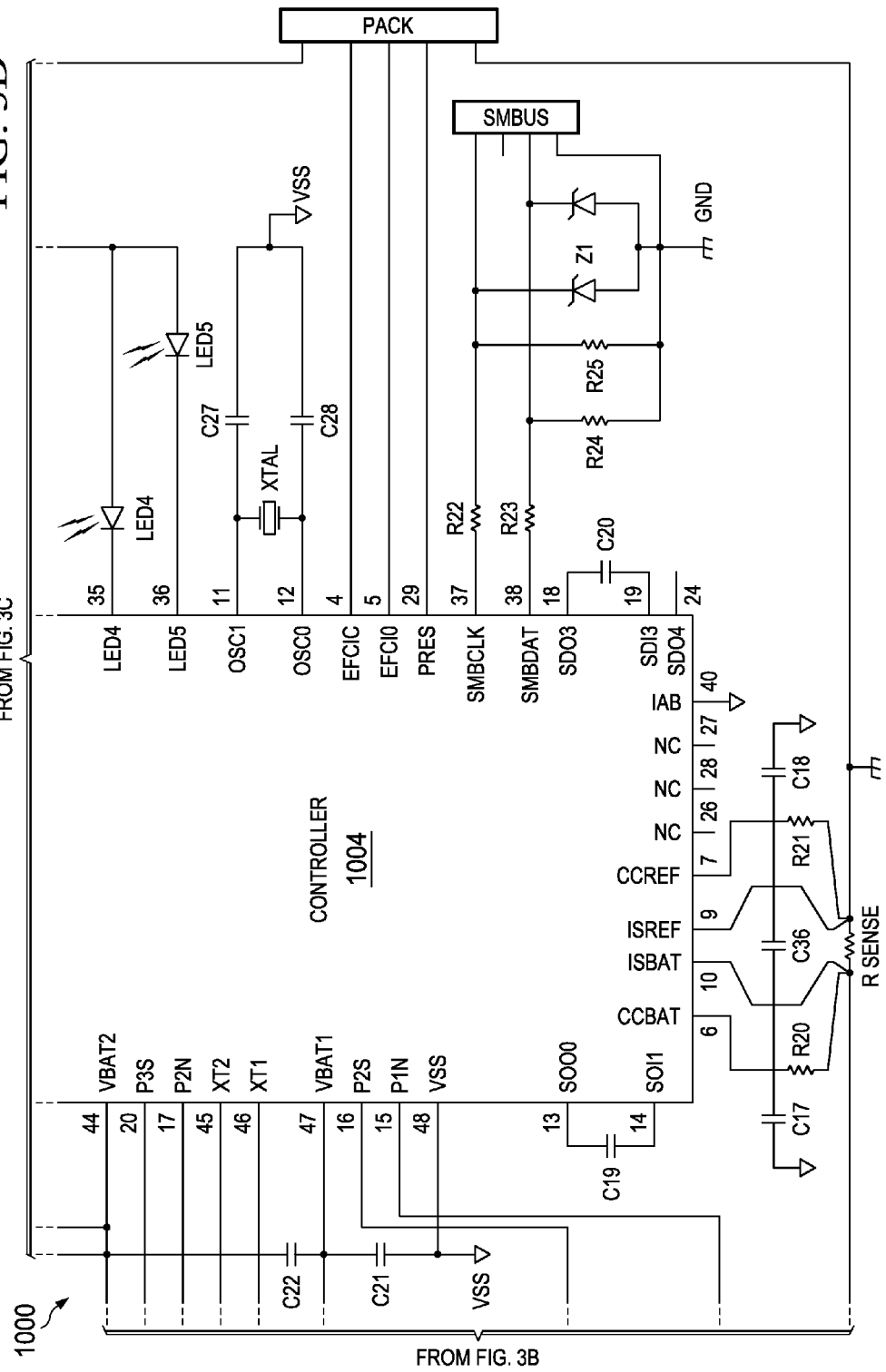

The battery management controller 804 can be an integrated circuit, a plurality of separate integrated circuits, modules of discrete components, or hybrids thereof FIG. 2 is a block diagram of the battery management controller 804, according to an embodiment of the present invention. FIG. 2 shows a single chip implementation of the battery management controller 804. For example, the battery management controller can be implemented using flash based RISC architecture. However, it must be appreciated that the battery management controller 804 can be implemented in a number of configurations by separating one or more of the functions that the management controller performs. The management controller 804 comprises a number of sections, each of which performs a desired control function. In this embodiment, the battery management controller 804 comprises a RISC CPU 900, first safety FET control 902, second safety 904, LED control 906, coulomb counter 908. The RISC CPU 900 is in communication with a flash memory 901 and random access memory SRAM 903. The first and second safety control blocks 902, 904 detect excessive external current flow and open the pack disconnect FETs (Q1, Q5 in FIG. 3). Led Control 906 drives a LED indication of State of Charge (e.g., LEDs 1-5 in FIG. 3). The Coulomb Counter 908 monitors the voltage on a current sense resistor and integrates the current flow to give passed charge in coulombs. The battery management controller 804 also includes a plurality of cell measurement and control units 910A, 910B, 910C and 910D. Each cell management and control unit is associated with one of the plurality of cells 802. Each cell management and control unit 910A. 910B, 910C and 910D is capable of measuring the voltage of each cell 802, measuring the temperature in each cell 802, or a combination of any thereof, as well as provide charge balancing between a cell and neighboring cells by controlling the cell balancing circuits 806. A detailed description of a balancing circuit for balancing charge between cells is provided in U.S. patent application Ser. No. 10/478,757 entitled "Method and Apparatus for Managing Energy in Plural Energy Storage Units," the contents of which are incorporated herein by reference.

In one embodiment, the balancing circuit 806 includes a reactive element, such as an inductor, and a first switch and a second switch. Alternatively, the reactive element can be a capacitor. In a closed position, the first switch places the balancing circuit in parallel with a first energy storage unit, for example cell 1 In the closed position, the second switch places the balancing circuit in parallel with a second energy storage unit, for example cell 2. The switch can be a field effect transistor (FET), however, any suitable switch can be used. The FETs may include an internal parallel body diode which can be used in cell balancing. The measurement and control units 910A. 910B, 910C and 910D can operate the FET switch in the balancing circuit to charge the inductor from a first energy storage unit. The diode automatically conducts to a second energy storage unit, e.g., a destination energy storage unit, when the switch is turned off.

The battery management controller 804 can control the operation of the balancing circuit 806, e.g., operate the first and second switches to place the balancing circuit in parallel with a selected cell, to balance the charge between cells. In one embodiment, the battery management controller 804 can, for example, support two balancing modes for the energy storage unit. In a first mode, excess energy within one cell during charging is burned off through a resistive burn-off process by, for example, the use of a resistive load. In another balancing mode, designated reactive pumping, excess energy from one cell is transferred to a second cell via the balancing circuitry during both charging and discharging.

The controller 804 further includes an internal oscillator 912, an LDO 914, a reset logic circuit 916 in communication with a watchdog circuit 917, a SMBus 918 and a power LAN 919. The internal oscillator provides the main clock for the CPU and an accurate time base for coulomb counting. The Low drop out Voltage (LDO) regulator 914 generates a 2.5V supply for the CPU from a higher cell voltage. The SMBus interface is used to communicate with a host appliance (e.g., a Notebook PC). The PowerLAN interface 919 communicates with each of the cell Measurement and Control function blocks which may be isolated from the main CPU. The controller 804 also includes an internal temperature measurement circuit 920. The controller 804 may be provided with a two on-chip temperature sensors. In addition, to the on-chip temperature sensors, off-chip cell temperature sensors may be provided. The off-chip cell temperature sensor may use diodes. Temperature sensing can be implemented to measure the temperature of each cell individually as well as the temperature of the cells in the battery pack as whole.

The controller 804 can provide synchronous measurements of voltage and current for each individual cell. Hence, true impedance measurement can be achieved. In addition, the controller 804 can detect the rate of charge change and can keep track of historical data including cell pack signature analysis. Furthermore, the controller 804 achieves full time effective cell charge balancing. Cell charge balancing prevents cell abuse, assures proper cell charging, and maximizes useable cycle life and runtime of the cell pack. These features allow improved monitoring of possible cell anomalies and/or other events that may occur during the usage lifetime of the cells.

FIG. 3 is a detailed circuit diagram of system 1000 for managing energy and monitoring temperature in a plurality of energy storage units connected in series 1002, according to an embodiment of the present invention. The management system 1000 includes a battery management controller 1004. In one embodiment, the battery management controller 1004 is the battery management controller 804 described above. The management system includes temperature measurement diodes 1006A, 1006B, 1006C and 1006D. These diodes are used to measure the temperature on a surface of each cell via a thermal conductor strip disposed, for example, between adjacent pairs of cells. In this embodiment, a pair of diodes is used to measure the temperature of each cell to improve temperature coefficient (mV per deg. C.). Alternatively, one diode may also be used to measure the temperature on a surface of each cell. The management system further includes balancing circuits 1008A, 1008B and 1008C. As shown in FIG. 3, balancing circuits 1008A, 1008B and 1008C comprise inductors L1, L2 and L3, respectively. The management system may be integrated in a single circuit, thus allowing the reduction of the number of components used and thus ultimately reducing the cost of fabrication.

Figure 4:
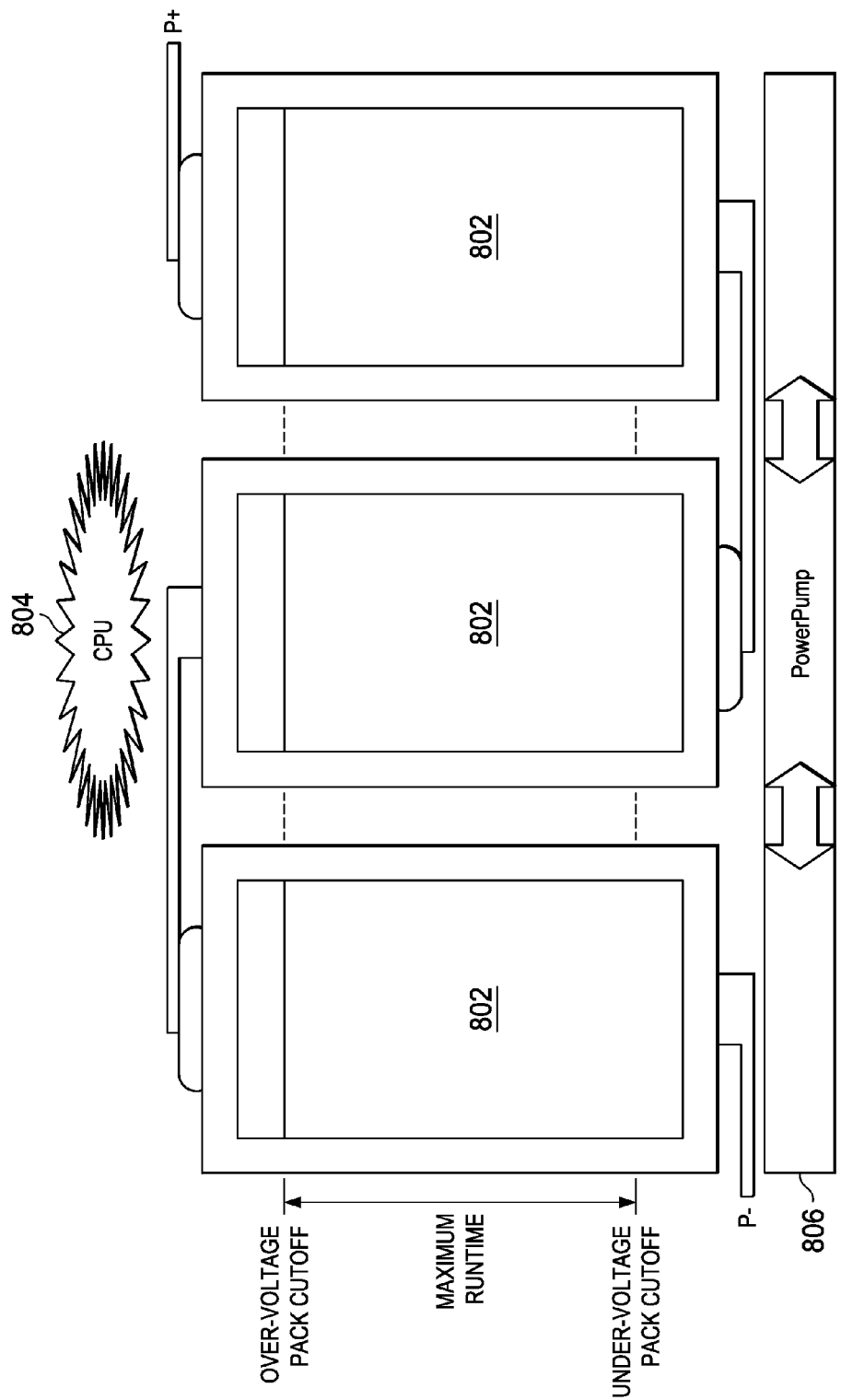
FIG. 4 is diagram illustrating the charge balancing process in three cells, according to an embodiment of the present invention.

FIG. 4 is diagram illustrating the charge balancing process in three cells, according to an embodiment of the present invention. Although three cells are depicted herein, it must be appreciated that any number of cells can be contemplated and balanced using the charge balancing process. For example, as shown in FIG. 1, four cells 802 are connected in series. In FIG. 4, three cells 802 are shown connected in series. The cells 802 are provided with two thresholds. An upper threshold representing the over voltage cut off, i.e., the voltage at which the charge of the cells is halted. A lower threshold representing the under voltage pack cutoff, i.e., the voltage at which the charge of the cells is started. Charge balancing circuits 806 labeled in FIG. 4 "power pump" manages the charge transfer, between the three cells 802. The charge balancing process enables the charge among cells to be balanced. The balancing of charge is controlled by controller 804, shown in more detail in FIGS. 1, 2 and 3. The balancing may occur during the charge of the cells, during the discharge of the cells and/or when the cells are idle. The balancing can occur cell-to-cell and/or globally across the plurality of cells. The balancing process enables cell over-voltage abuse to be minimized and each cell's charge imbalance history to be tracked. Furthermore, the balancing process enables early failure modes detection including change in self discharge or capacity divergence. Thus, the balancing process improves the overall reliability, safety and efficiency of the cells in the cell pack. In addition, the balancing process improves the cell pack life cycle.

FIG. 5A is a typical plot of the voltage across each cell during a charging cycle when charge balancing is not enabled or not provided versus the time of charge. As shown in FIG. 5A, the third cell (cell 3) in a four-cell pack reaches the 4300 mV (4.3 V) safety limit (at about 8000 s) before the other cells (i.e., cell 1, cell 2 and cell 4) reach their full charge limit of 4200 mV. As a result, the charging cycle is ended (at about 8000 s) before the other cells (cell 1, cell 2 and cell 4) reach their full charge. This pattern would be repeated on subsequent charge cycles abusing cell 3 and also limiting the full charge capacity.

FIG. 5B is a plot of a simulation of a voltage across each cell during a charging cycle when charge balancing is enabled versus the time of charge. The balancing of the charge among the cells (cell 1, cell 2, cell 3 and cell 4) permits the charging to complete without abusing any cell. The cells are balanced within 10 mV, and all reach about 4200 mV, after approximately 10000 seconds. For example, as shown in FIG. 5B, the charge in cell 3 is reduced by transferring some of the charge in cell 3 to the other cells (cell 1, cell 2 and/or cell 4).

Figure 6A:
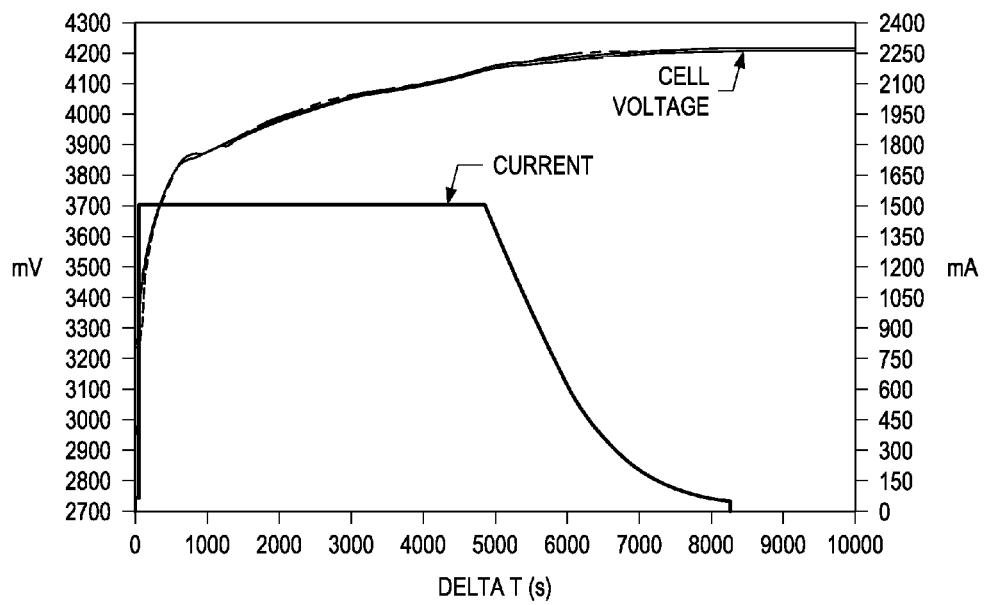
FIG. 6A is a plot of the voltage across each cell during charging when charge balancing is enabled versus the time of charge.
Figure 6B:
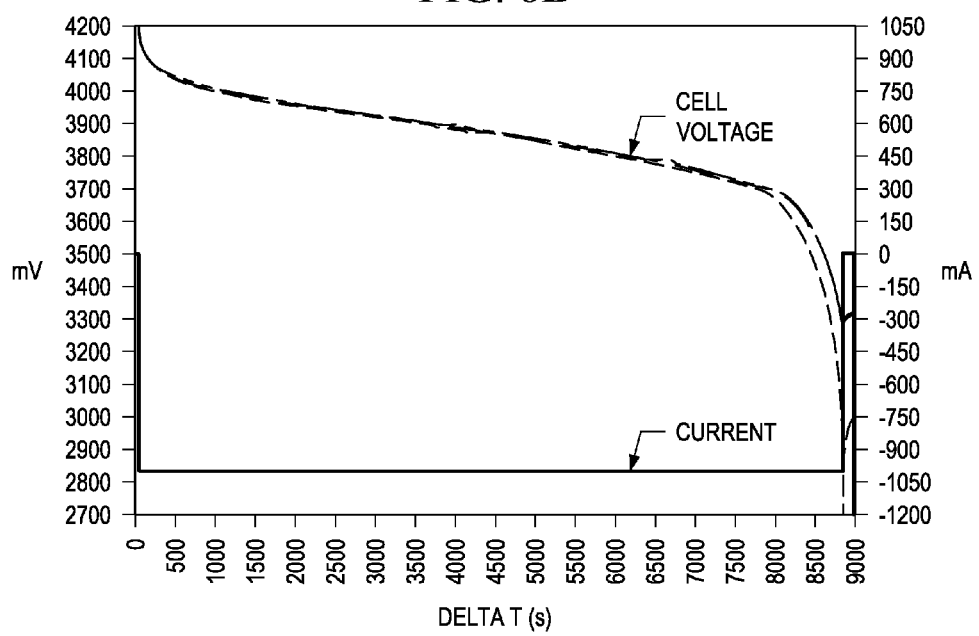
FIG. 6B is a plot of the voltage across each cell during discharge when charge balancing is enabled versus the time of discharge.

FIG. 6A is a typical plot of voltage across each cell during charging when charge balancing is enabled and shows the complete charge phase. FIG. 6B is plot of a corresponding discharge phase when charge balancing is enabled versus the time. The pack current through the series of connected cells is also plotted versus time of charge and discharge. As shown in FIGS. 6A and 6B a tight charge control is established between the various cells (cell 1, cell 2, cell 3 and cell 4) during both the charging phase (FIG. 6A) and the discharging phase (FIG. 6B). This is reflected by the very small voltage difference between the voltages across the cells during the charge and discharge phases. The charge and discharge profiles show minimum stress for the cells. A precise control of the charge and discharge process is maintained throughout the life cycle of the cells. As a result, a maximum runtime using the cells and longer cell-pack can be achieved.

FIG. 7 is a typical plot of voltage across each cell in a seven cell-pack versus the time showing the effect of enabling charge balancing on the voltage across each cell. Specifically, it can be observed from this plot that when charge balancing is not enabled, the voltage across each cell is different. This can be due, for example, to variance in state of charge, impedance and/or capacity of the cells. However, when charge balancing is enabled, as indicated by the label "A" in FIG. 7, the voltage across each of the cells equalizes. The cell charge balance can be restored, for example, within approximately 40 minutes from enabling of the charge balancing, as indicated by the label "B" in this plot.

Returning to FIGS. 1, 2 and 3, in addition to controlling the balancing of the cells using cell balancing circuits 806, the controller 804 also includes cell temperature measurement/monitoring circuits 910A, 910B, 910C and 910D. Temperature sensing/monitoring in each individual cell can be implemented to measure/monitor the temperature of each cell individually as well as the temperature of the battery pack as whole. The controller 804 can be configured to process a temperature at a surface of each individual cell to obtain an internal temperature in each of the cells. The goal of cell based temperature monitoring can be to determine an accurate absolute temperature at each cell to ensure a safe operation range and also to sense thermal signatures which indicate a heat (Q) dump from a micro-short circuit in the cell. In order to accomplish the above goals, one approach is to eliminate effects of other heat sinks or sources at the temperature sensors. The heat sinks or heat sources can be eliminated physically by insulating or shielding the cell (or cells) or mathematically by measuring heat flow using two sensors and performing an extrapolation. Another approach is to apply a pre-emphasis procedure to determine the internal temperature of the cell using either a measured surface temperature or a calculated extrapolated surface temperature. There are various implementations to accomplish the above cell based temperature monitoring. The following paragraphs describe some of the implementations.

Figure 8:
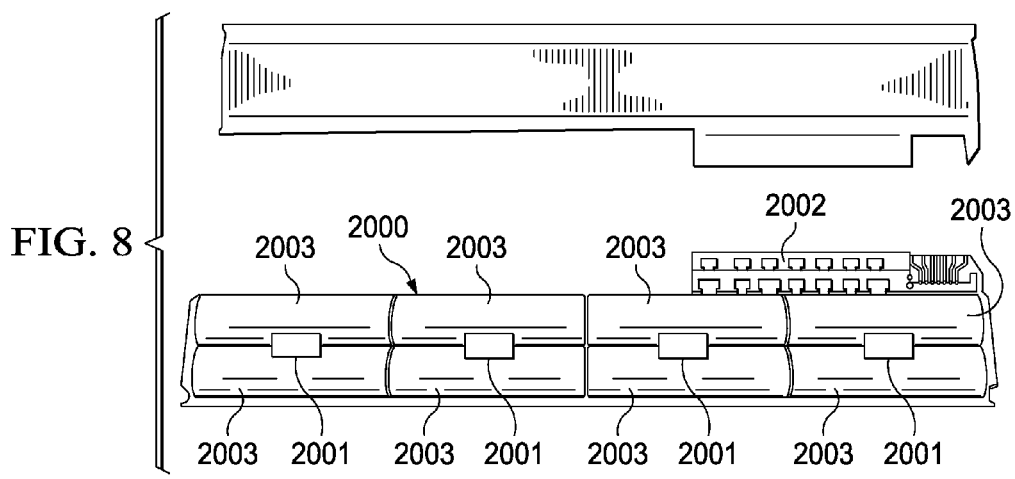
FIG. 8 shows an example of implementing temperature determination in a cell-pack having a plurality of temperature sensors, according to an embodiment of the present invention.

FIG. 8 shows an example of a cell-pack having a plurality of temperature sensors, according to an embodiment of the present invention. In this embodiment, the effects from heat sinks or heat sources unrelated to the cells are eliminated physically by shielding the sensor. For example, the sensor is thermally isolated by the cells. The cell pack 2000 includes 4 juxtaposed pairs of cells 2003, i.e., a total of 8 cells 2003. A plurality of temperature sensors 2001 (in this case, 4 temperature sensors 2001), are placed between the pairs of cells 2003 in contact with a surface of each cell 2003. The plurality of temperature sensors 2001 are connected to controller 804, 1004. Specifically, one temperature sensor (e.g., diodes) is placed in the valley between each of the juxtaposed pairs of cells 2003 and in good thermal contact with the cells. The sensor is insulated from external temperatures by an insulating air pocket. Each one of the temperature sensors measures the mean temperature of the two cells. The two cells are connected in parallel. Therefore, the two cells act as a single cell. The cell pack 2000 also includes electronic circuitry 2002 for temperature monitoring and cell charge management including cell charge balancing. The temperature sensors 2001 are connected to the electronic circuitry 2002 through a flexible circuit (not shown). Using a flexible circuit allows to place the electronic circuitry 2002 away from the temperature sensors 2001. Hence, the temperature sensors 2001 are "thermally isolated" from outside heat sources, including heat that may be generated by the electronic circuitry 2002. In this way, the temperature sensors 2001 measure a temperature $T_{means}$ of the cells 2003, with minimal or substantially no perturbation from outside heat sources, including heat generated by the electronic circuitry 2002. In other words, the cells 2003 and associated temperature sensors 2001 are shielded from outside heat sources. In this case, a temperature inside each of the cells can be determined by compensating for the thermal mass, i.e., thermal lag, of the temperature sensors by employing pre-emphasis based on the rate of change of temperature from the temperature sensors. In this embodiment, the cells 2003 have a cylindrical shape and the temperature sensors 2001 are disposed between each pair of cells 2003. However, the cells 2003 can have other shapes, such as for example, a parallelepiped shape, in which case the temperature sensors 2001 can be disposed in contact with flat surfaces of two superposed cells 2003.

In one embodiment of the invention, compensation for thermal lag constant τ can be obtained by adding a term (Derivative.τ) to the measured or calculated surface temperature. To limit the noise in this term, a first order filter of time constant τ/DL (where DL is the derivative lift) is applied prior to calculating the derivative. A filter, as expressed by equation (2), reduces or dampens the contribution of the change in the measured temperature $T_{means}$ by multiplying by a factor β. Hence, the estimate of internal cell temperature or compensated temperature $T_{comp}$ in this case is calculated by the controller 804 as follows:

$$T_{comp} = T_{means} + (T_{lowpass} - T_{lowpass}')\tau/dt, \quad (1)$$

where $$T_{lowpass} = T_{lowpass}'(1-\beta) + \beta T_{means} \quad (2)$$

with $$\beta = \frac{dt \cdot DL}{\tau} \quad (3)$$

and $T_{means}$ being the measured or calculated surface temperature of the cell, dt, being the sample time and $T_{lowpass}$' corresponding to a previous sample of $T_{lowpass}$.

The terms $T_{lowpass}$ and $T_{lowpass}$' are initialized to the measured temperature $T_{means}$.

The thermal lag constant τ is fixed for a given layout and can be characterized using a measurement test. In the measurement test, heat is applied at a certain time and the response of the temperature sensor is recorded and the time lag between the application of the heat and the response time of the temperature sensor is recorded. The response will approximate to a $1^{st}$ order exponential response. The thermal lag constant τ can be found from a best fit exponential response.

In order to improve the accuracy of an absolute temperature determination per cell in the case where the heat sinks or heat sources are not completely eliminated physically, the effects of the heat source can be taken into account and eliminated mathematically by measuring heat flow using two sensors and performing an extrapolation. The controller 804 can be configured to perform the temperature extrapolation method. The temperature extrapolation method can be used when it is desired to minimize or substantially eliminate effects of "external" heat sources on the measurement of a cell temperature. The external heat sources may include heat sources from electronic devices or the like. In minimizing the effects of external heat sources on a temperature of a cell, temperature gradients originating from a micro-short in the cell can be distinguished from external heat source and measured.

Figure 9A:
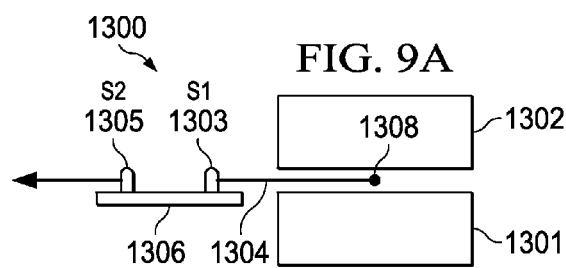
FIG. 9A shows an example of implementing an internal temperature estimation method in a cell-pack having a plurality of temperature sensors, according to one embodiment of the present invention.

FIG. 9A depicts an implementation of a temperature sensing scheme, according to an embodiment of the present invention. In this embodiment, the effects of external heat sinks or heat sources are minimized by placing thermally conductive strip 1304 between cells 1301 and 1302. To further improve measurement accuracy, a heat flow from a potential external heat source is measured using a pair of temperature sensors and a temperature of the surface of the cell is extrapolated. In a pack of cells comprising a plurality of cells 1300, a first temperature sensor 1303 is connected to a thermally conducting strip 1304. The strip 1304 is disposed between two adjacent cells 1301 and 1302 in the plurality of cells 1300. The cells 1301 and 1302 are connected in parallel and act as a single cell. The strip 1304 can include a metal such as copper, nickel or the like. A thermal impedance of the strip 1304 and its interface to the cells is relatively small. The first temperature sensor 1303 is connected to second temperature sensor 1305 via a material 1306 having a certain thermal impedance. The dominant path for heat flow to/from sensor 1303 is via this material and this heat flow is monitored using the two temperature sensors 1303 and 1305. The temperature at a point 1308 between the cells 1301 and 1302 is extrapolated from the external temperature measurements using the two temperature sensors 1303 and 1305.

Figure 9B:
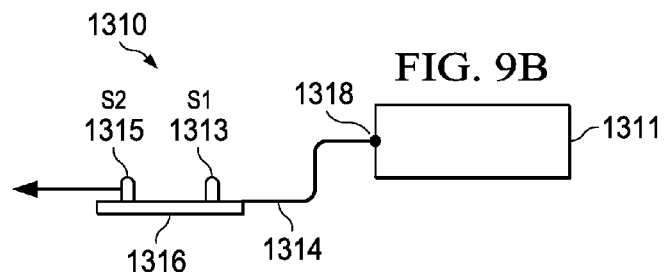
FIG. 9B shows another example of implementing an internal temperature estimation scheme, according to another embodiment of the present invention.

FIG. 9B depicts another implementation of a temperature sensing scheme, according to an embodiment of the present invention. In this embodiment, similar to the embodiment depicted in FIG. 9A, a heat flow from a potential external heat source is measured using a pair of temperature sensors S1 and S2 and a temperature of the cell extrapolated. However, in FIG. 9B, the temperature sensing element is not physically located between cells. In a temperature sensing apparatus 1310, a first temperature sensor 1313 is connected to an electrical terminal 1318 of a cell 1311 via strip 1314. The strip 1314 can be electrically conductive or nonconductive. In one embodiment, the strip 1314 can include a metal such as copper, nickel or the like. In the case where the strip 1314 is both electrically conductive and thermally conductive, the strip 1314 can be used to electrically and thermally connect a pole of the cell to one terminal of sensor 1313. Similar to the above embodiment, a thermal impedance of the strip 1314 is fixed for a given material and geometry. The first temperature sensor 1313 is connected to a second temperature sensor 1315, via a material 1316, having a fixed thermal impedance and represents the dominant heat flow path from one or more potential external heat sources. Heat flow is monitored using the two temperature sensors 1313 and 1315. The temperature at a point 1318 is extrapolated from the external temperature measurements using the two temperature sensors 1313 and 1315.

Referring to both FIGS. 9A and 9B, two temperatures $T_1$ and $T_2$ are measured using the two temperature sensors 1303, 1313 and 1305, 1315, respectively. $T_1$ is the temperature measured by the sensor 1303, 1313 which is closest to the cells 1301 and 1302 or cell 1311. $T_2$ is the temperature measured by the temperature sensor 1305, 1315 which is farthest to the cells 1301 and 1302 or cell 1311. The material 1306, 1316 separating the two temperatures sensors 1303 and 1305 or temperature sensors 1313 and 1315 has a thermal impedance Rb. The strip 1304 disposed (e.g., inserted) between the two cells 1301 and 1302 has a thermal impedance Ra. The strip 1314 connected to a terminal of the cell 1322 has a thermal impedance Ra. The two thermal impedances Ra and Rb, determine an extrapolation ratio α defined by the following equation, $$\alpha = \frac{Ra + Rb}{Rb} \quad (4)$$

α is fixed for a given layout and can be characterized using a measurement test. The controller 804 then calculates the extrapolated temperature $T_{ext}$ at point 1308 between the cells 1301 and 1302 or at point 1318 at cell 1311 using the extrapolation ratio α and the two temperatures $T_1$ and $T_2$ measured by the temperature sensors 1303, 1313 and 1305, 1315 as follows:

$$T_{ext} \alpha T_1 + (1-\alpha) T_2 \quad (5)$$

Similar to the description above, the controller 804 calculates a temperature inside each cell by using the extrapolated surface temperature $T_{ext}$ at point 1308 between cells 1301 and 1302 and at point 1318 at cell 1311 and by compensating the thermal mass, i.e., thermal lag, of the temperature sensors by employing pre-emphasis based on the rate of change of temperature from the temperature sensors.

In this case, the estimate of internal cell temperature or compensated temperature $T_{comp}$ can be calculated using the extrapolated temperature $T_{ext}$, as follows:

$$T_{comp} = T_{ext} + (T_{lowpass} - T_{lowpass}') \tau/dt, \quad (6)$$

where $T_{lowpass} = T_{lowpass}'(1-\beta) + \beta T_{ext}$ (7)

and dt being the sample time, β being expressed in equation (3), and $T_{lowpass}$' corresponding to a previous sample of $T_{lowpass}$.

By estimating the internal temperature of the cell, the effect of ambient temperature or surrounding temperature change on the cell is reduced, thus providing a more accurate measurement of the temperature of the cell. In addition, by estimating the internal temperature, the warm-up delays due to thermal mass can be minimized, hence providing a faster temperature response. The internal temperature estimation method allows the tracking or monitoring of the internal temperature in each cell and thus provides a temperature history for each cell continuously. In addition, the internal temperature estimation method as related to the arrangement in FIGS. 9A and 9B allows for active "noise cancellation" in temperature measurements by extrapolating from the temperature of two sensors positioned appropriately and separated with a material having a certain thermal impedance to a point of interest inside the cell. As a result, this method provides estimates of internal temperature which are sufficiently free of external influences and sensor delay to allow detection of small but sudden heat generation within the cell which provides an early warning sign of cell failures. In addition to cell temperature monitoring, the internal temperature estimation method can also be used for temperature monitoring of protection devices such as FETs and fuses. Multiple sensors may also be used to acquire a temperature measurement. This provides redundant measurements which increases reliability.

Figure 10:
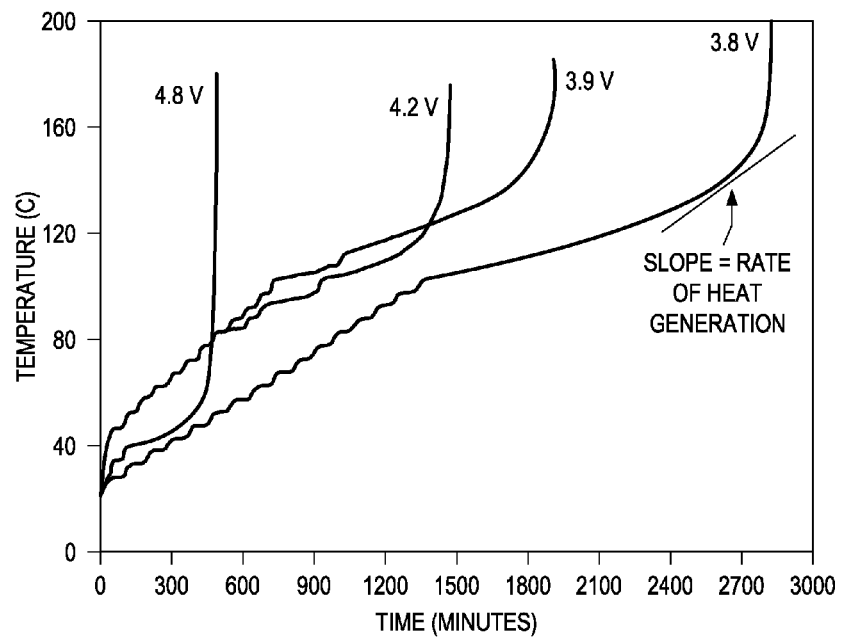
FIG. 10 shows an Accelerating Rate calorimetry experiment on commercial cells showing how cell voltage affects thermal stability.

FIG. 10 shows a graph of an Accelerating Rate Calorimetry experiment on commercial cells showing how cell voltage affects thermal stability. The temperature measurement is performed on commercial cells having $LiCoO_2$ cathodes. This graph shows how cell voltage affects thermal stability. It can be seen that rate of exothermic heat generation increases with both temperature and voltage. The onset of thermal runaway occurs when the rate of heat generation exceeds the rate of heat loss of the cell to its surroundings. A cell's cooling rate depends on temperature of neighboring cells. As a result, the temperature of all cells, globally, plays a role in the thermal stability of each cell.

Figure 11:
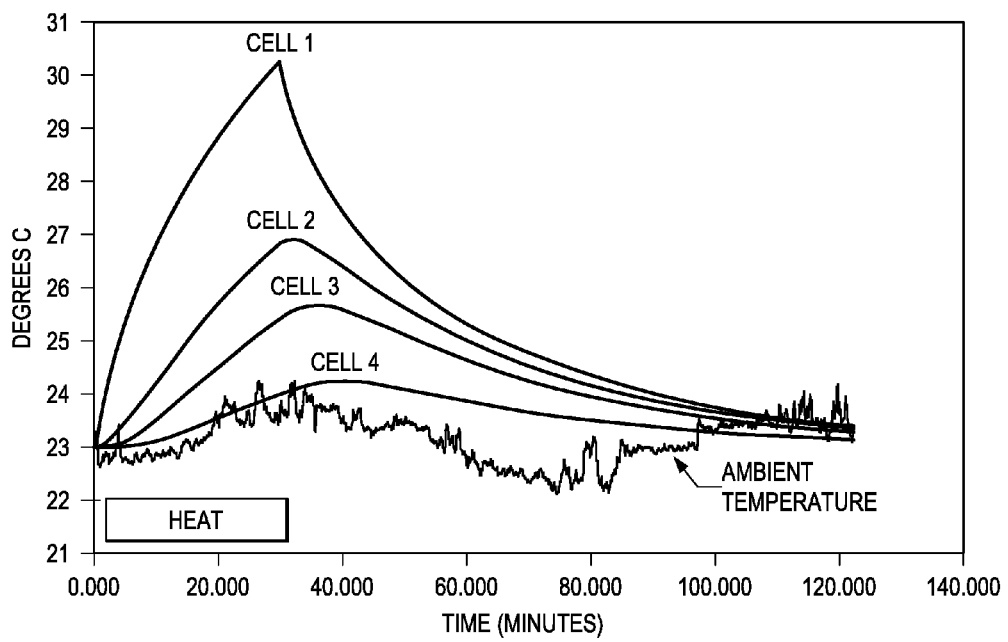
FIG. 11 is a plot showing the temperature response of each cell in a multicell pack to the heat generated in a simulated short in one cell.

FIG. 11 is a plot of the temperature for each cell in a four cell pack versus time during a test when one cell is exposed to an external heat source. The test is performed by applying a heat source to cell 1 and "measuring" the temperatures at all cells (cells, 1, 2, 3 and 4). As shown in this graph, the measured temperature in cell 1 experiences a 7 deg. C. rise in about 20 minutes while a temperature sensor placed on the cell pack as a whole, which corresponds to the temperature sensor placed on cell 3, measures a slower and smaller temperature rise of about 2.5 deg. C. in about 30 minutes. Hence, the temperature measured for the pack of cells as a whole is not a good indication of the thermal status of each cell. In addition, this plot also shows that heat in one call (cell 1) may be transmitted to other neighboring cells (cell 2, cell 3 and cell 4). As a distance between a heat source (for example, one cell generating heat) and other cells increases, the effect of heat on the other cells diminishes. Therefore, monitoring the temperature of each cell may be the best approach for detecting and thus preventing overheating of each of the cells.

Figure 12:
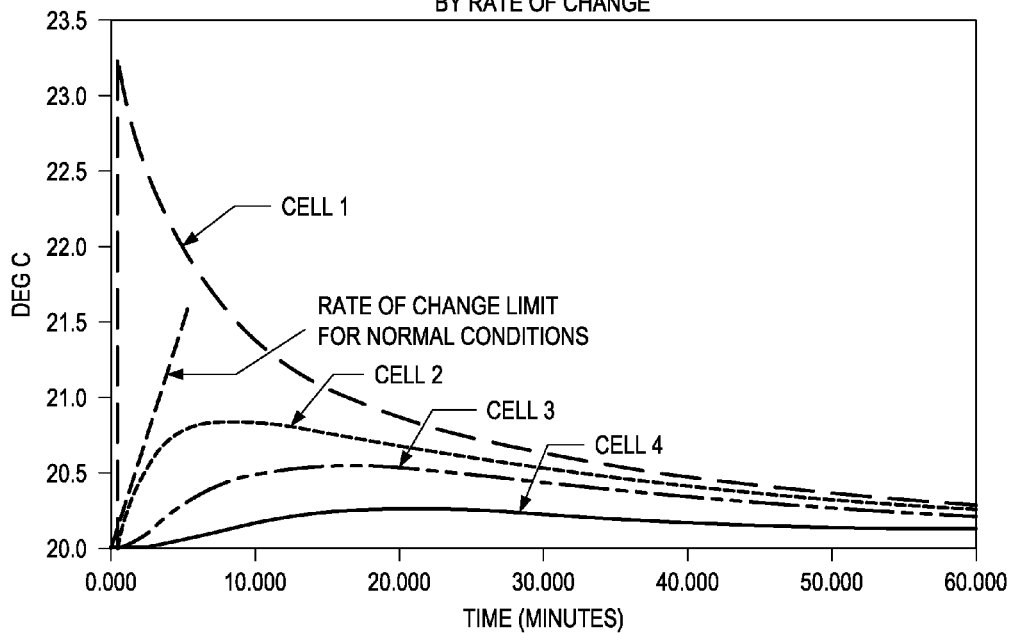
FIG. 12 is a plot of a simulation of temperature versus time for each of the cells.

FIG. 12 is a plot of temperature versus time for each of the cells during a test to simulate a soft short in one cell. A sharp rise in temperature is simulated in one cell (cell 1) and the temperature effects are "measured" (in the simulation) in each cell in the cell pack (cell 1, cell 2, cell 3 and cell 4). As shown by this plot, the single temperature monitoring of one cell (cell 3) fails to capture or detect the rapid rise in temperature that occurred on cell 1. Hence, temperature monitoring of each cell can enable events such as rapid temperature rise on any one of the cells to be captured. The rate of change in temperate is one parameter that may signal abnormal events such as a rapid rise in temperature. The rate of change in temperature can be defined as a slope of temperature as function of time. For example, by setting a test threshold above the normal rate of temperature change in a cell, the controller 804 can compare rates of change of temperature in cells to the threshold and a course of action can be taken depending on the outcome. For example, a normal rate of change of temperature of a certain type of cell can be characterized during a charge/discharge cycle and used to determine a suitable exception threshold in the controller 804. The controller 804 can then compare the rate of change of temperature of a cell to the normal rate of temperature change. When the rate of change is greater than the normal rate of change, this signals a rapid rise of temperature, and consequently, the controller can be configured to take appropriate action. When, on the other hand, the rate of change is smaller or equal to the normal rate of change, the controller 804 can be configured to not take any action since the cell is within the normal established temperature conditions, and hence, running in a "normal" operation condition.

In addition, the controller 804 can be configured to compare the rate of change of estimated internal temperature to a safety rate of change threshold, as described above with regard to FIG. 12, to determine when the corresponding cell is malfunctioning. Depending on the outcome, the controller 804 can take appropriate action, such as warning the user of the cell pack of an abnormal event and/or discharging the cells in the cell pack.

Figure 13:
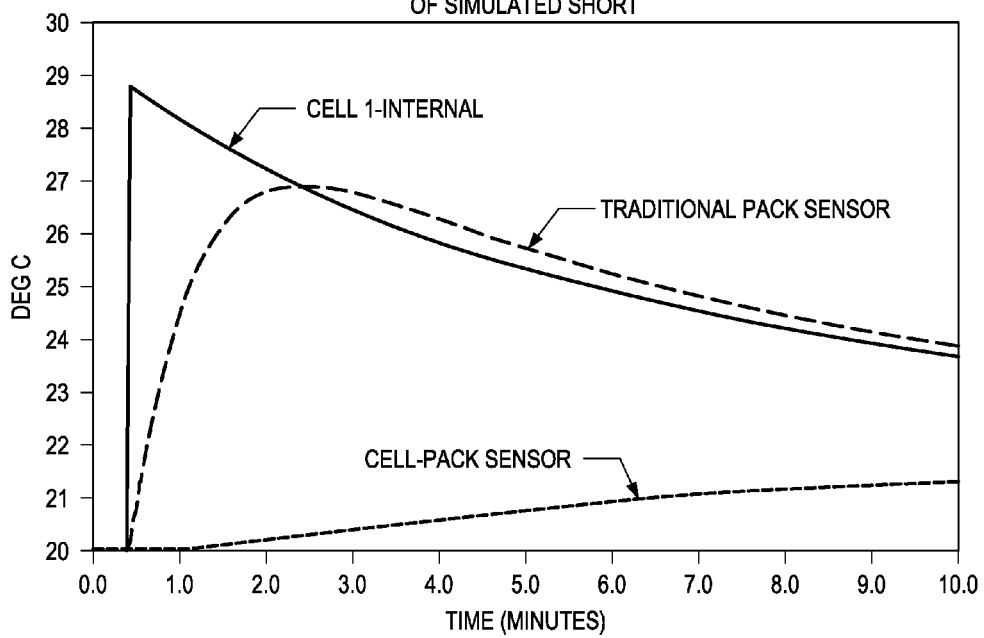
FIG. 13 is a plot of simulated external and internal temperatures versus time for one cell and a plot of external temperature obtained through one sensor on a pack of cells with a simulation of a short circuit.

FIG. 13 is a plot of simulated external and internal temperatures versus time for one cell and a plot of external temperature obtained with one sensor on a pack of cells with a simulation of a short circuit. A short circuit is simulated in one cell (cell 1) and the internal simulated temperature profile in the cell 1 is compared with the external temperature profile of cell 1. The external temperature on the one cell is "measure" (in the simulation) using a temperature sensor (one or more temperature sensors) disposed, for example, on an external surface of the cell. The single pack temperature sensor is usually placed inside the enclosure that houses the pack of cells. The single pack temperature sensor is not necessarily placed in the vicinity or on a surface of a cell. In general, the plot in FIG. 13 shows that on the once cell (cell 1), the internal temperature exhibits a rapid rise to a temperature of about 29 deg. C. almost immediately, when the short circuit occurs, while the external temperature "measured" with a sensor shows a delayed rise, i.e., slow signature, with a peak temperature of 27 deg. C. reached within approximately 2 minutes. The delayed rise in temperature is due to thermal mass, i.e., thermal lag, of the temperature sensors. On the other hand, the single pack sensor, which measures a temperature of the cells pack as a whole, shows a slow temperature rise and low temperature not exceeding 22 deg. C. even after about 10 minutes, thus failing to detect the short circuit event. This result further demonstrates the need for measuring the temperature of the cells individually as opposed to measuring the temperature of the cells pack as a whole.

FIG. 14 is a plot of simulated internal and external temperatures of 2 cells and a temperature of a cells pack captured using a single pack temperature sensor versus time. This plot shows that the internal temperature measurement employing an internal temperature estimation method provides the fastest response time when compared with external temperature measurement. Indeed, the external temperature response exhibits a temperature response delay, as shown by the double arrow in FIG. 14. While the external temperature measurement on one cell exhibits a delay in the response to a temperature rise, the single pack measurement sensor does not even detect the temperature rise event that occurred in the one cell. This demonstrates that the internal temperature estimation method is most appropriate in detecting earlier events that may occur in a cell such as a rising temperature due to a short circuit or, the like in one or more cells. As stated previously, in the internal temperature estimation method, a pre-emphasis procedure is used to calculate the internal temperature using an external temperature measured on a surface of the cell. The internal temperature estimation method compensates for heat loss and response time of the temperature sensor disposed on a surface of the cell.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

Moreover, the method and apparatus of the present invention, like related apparatus and methods used in the electronics arts are complex in nature, are often best practiced by empirically determining the appropriate values of the operating parameters, or by conducting computer simulations to arrive a best design for a given application. Accordingly, all suitable modifications, combinations, and equivalents should be considered as falling with the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A system for measuring a temperature in at least one energy storage unit, comprising:
    at least one temperature sensor thermally coupled to the at least one energy storage unit; and
    a battery management controller in communication with the at least one temperature sensor;
    wherein the battery management controller is configured to process a temperature of the at least one energy storage unit to obtain an internal temperature of the at least one energy storage unit;
    wherein the internal temperature $T_{comp}$ in the at least one energy storage unit is calculated using a temperature $T_{means}$ measured by the at least one temperature sensor; and
    wherein the internal temperature $T_{comp}$ is calculated as follows:

$$T_{comp} = T_{means} + (T_{lowpass} - T_{lowpass}') \tau / dt,$$

where $$T_{lowpass} = T_{lowpass}'(1-\beta) + \beta T_{means} \text{ with } \beta = \frac{dt \cdot DL}{\tau}$$

and dt being the sample time and $T_{lowpass}'$ corresponding to a previous sample of $T_{lowpass}$, $\tau$ is a time constant and DL is the derivative lift.

2. The system of claim 1, wherein the internal temperature of the at least one energy storage unit is computed by taking into account a thermal lag of the at least one temperature sensor.

3. The system of claim 2, wherein the internal temperature $T_{comp}$ in the at least one energy storage unit is employing a derivative term and a time constant $\tau$.

4. The system of claim 1, wherein the at least one temperature sensor includes a first temperature sensor, a second temperature sensor and a material is disposed between the first temperature sensor and the second temperature sensor.

5. The system of claim 4, further comprising a strip, the strip being connected to the first temperature sensor and disposed proximate the at least one energy storage unit.

6. The system of claim 5, wherein the strip is disposed between two adjacent storage units.

7. The system of claim 5, wherein the battery management controller is further configured to extrapolate a temperature at a point between two energy storage units from external temperature measurements using the first temperature sensor and the second temperature sensor.

8. The system of claim 7, wherein the extrapolated temperature $T_{ext}$ between the two energy storage units is dependent on an extrapolation ratio and a temperature measured by the first temperature sensor and a temperature measured by the second temperature sensor.

9. The system of claim 8, wherein $T_{ext} = \alpha T_1 + (1-\alpha) T_2$, wherein $\alpha$ is the extrapolation ratio and $T_1$ and $T_2$ are temperatures measured by the first temperature sensor and the second temperature sensor, respectively.

10. The system of claim 9, wherein the extrapolation ratio $$\alpha = \frac{Ra + Rb}{Rb}$$

where Ra is a thermal impedance of the strip and Rb is a thermal impedance of the material disposed between the first temperature sensor and the second temperature sensor.

11. The system of claim 7, wherein the battery management controller is further configured to determine a correction factor that compensates for thermal lag to the first and second temperature sensors and determine the internal temperature using the correction factor and the extrapolated temperature $T_{ext}$.

12. The system of claim 11, wherein the internal temperature $T_{comp}$ in the two energy storage units is determined from a derivative term and a time constant $\tau$.

13. A system for measuring a temperature in at least one energy storage unit, comprising:
    at least one temperature sensor thermally coupled to the at least one energy storage unit; and
    a battery management controller in communication with the at least one temperature sensor;
    wherein the battery management controller is configured to process a temperature of the at least one energy storage unit to obtain an internal temperature of the at least one energy storage unit;
    wherein the internal temperature $T_{comp}$ in the at least one energy storage unit is calculated using a temperature $T_{means}$ measured by the at least one temperature sensor; and
    wherein the internal temperature $T_{comp}$ is calculated as follows:

$$T_{comp} = T_{ext} + (T_{lowpass} - T_{lowpass}') \tau / dt,$$

where $$T_{lowpass} = T_{lowpass}'(1-\beta) + \beta T_{means} \text{ with } \beta = \frac{dt \cdot DL}{\tau}$$

and dt being the sample time and $T_{lowpass}'$ corresponding to a previous sample of $T_{lowpass}$, $\tau$ is a time constant, DL is the derivative lift, and $T_{ext} = \alpha T_1 + (1-\alpha)T_2$ where $\alpha = (Ra+Rb)/Rb$, $T_1$ and $T_2$ are temperatures measured by temperature sensors, Ra and Rb are thermal impedances.

14. A method of determining an internal temperature in at least one energy storage unit, comprising:
   measuring a surface temperature of at least one energy storage unit; and
   processing the surface temperature of the at least one energy storage unit to obtain an internal temperature in the at least one energy storage unit;
   wherein processing the surface temperature comprises calculating the internal temperature in the at least one energy storage unit using the measured surface temperature $T_{means}$;
   wherein calculating the internal temperature $T_{comp}$ comprises calculating the internal temperature using the following equations:

$$T_{comp} = T_{means} + (T_{lowpass} - T_{lowpass}')\tau/dt,$$

where $$T_{lowpass} = T_{lowpass}'(1-\beta) + \beta T_{means} \text{ with } \beta = \frac{dt \cdot DL}{\tau}$$

and dt being the sample time and $T_{lowpass}'$ corresponding to a previous sample of $T_{lowpass}$, $\tau$ is a time constant and DL is the derivative lift.

15. The method of claim 14, wherein processing the surface temperature comprises computing the internal temperature by taking into account thermal lag of the measured surface temperature.

16. The method of claim 14 wherein calculating the internal temperature $T_{comp}$ in the at least one energy storage unit comprises multiplying a derivative term by a time constant $\tau$.

17. The method of claim 14, wherein the processing comprises extrapolating a temperature for the at least one energy storage unit from the measured surface temperature.

18. The method of claim 17, wherein extrapolating comprises calculating the internal temperature using the following formula:

$$T_{ext} = \alpha T_1 + (1-\alpha)T_2,$$

where $\alpha$ is an extrapolation ratio and $T_1$ and $T_2$ are temperatures measured by a first temperature sensor and a second temperature sensor adjacent to the first temperature sensor, the two sensors being separated by a material having a known thermal impedance.

19. The method of claim 18, wherein the extrapolation ratio $$\alpha = \frac{Ra + Rb}{Rb}$$

where Ra is a thermal impedance between the first temperature sensor and the at least one energy storage unit and Rb is a thermal impedance of the material disposed between the first temperature sensor and the second temperature sensor.

20. The method of claim 19, wherein processing the surface temperature comprises calculating the internal temperature in the at least one energy storage unit using the extrapolated surface temperature $T_{ext}$.

21. The method of claim 20, wherein calculating the internal temperature comprises determining a correction factor that compensates for thermal lag of the first and second temperature sensors and determining the internal temperature using the correction factor and the extrapolated temperature $T_{ext}$.

22. A system for estimating a temperature in at least two energy storage units, comprising:
   at least one temperature sensor thermally coupled to the at least two energy storage units; and
   a battery management controller in communication with the at least one temperature sensor,
   wherein the at least one temperature sensor is substantially thermally isolated by the at least two energy storage units;
   wherein the internal temperature $T_{comp}$ in the at least two energy storage units is calculated using a temperature $T_{means}$ measured by the at least one temperature sensor;
   wherein the internal temperature $T_{comp}$ is calculated as follows:

$$T_{comp} = T_{means} + (T_{lowpass} - T_{lowpass}')\tau/dt,$$

where $$T_{lowpass} = T_{lowpass}'(1-\beta) + \beta T_{means} \text{ with } \beta = \frac{dt \cdot DL}{\tau}$$

and dt being the sample time and $T_{lowpass}'$ corresponding to a previous sample of $T_{lowpass}$, $\tau$ is a time constant and DL is the derivative lift.

23. The system of claim 22, wherein the battery management controller is configured to process the surface temperature of the at least two energy storage units to obtain an internal temperature in each of the at least two energy storage units.

24. The system of claim 23, wherein the internal temperature in the at least two energy storage units is computed by taking into account a thermal lag of the at least one temperature sensor.

25. The system of claim 22, wherein the internal temperature $T_{comp}$ in the at least two energy storage units is calculated by multiplying a derivative term by a time constant $\tau$.

* * * * *